US008434539B2

(12) United States Patent
Lam

(10) Patent No.: US 8,434,539 B2
(45) Date of Patent: May 7, 2013

(54) CASE SEALER TAPE APPLICATOR

(75) Inventor: Joe Augustine S. T. Lam, Vancouver (CA)

(73) Assignee: Lamus Enterprises Inc., Vancouver, B.C. (CA)

( * ) Notice: Subject to any disclaimer, the term of this patent is extended or adjusted under 35 U.S.C. 154(b) by 1200 days.

(21) Appl. No.: 11/905,187

(22) Filed: Sep. 28, 2007

(65) Prior Publication Data

US 2009/0084504 A1 Apr. 2, 2009

(51) Int. Cl.
*B32B 37/00* (2006.01)

(52) U.S. Cl.
USPC ........... 156/538; 156/494; 156/541; 156/384; 156/577; 156/584; 156/504; 156/505; 156/502; 242/129.6; 242/324.2; 242/326; 242/326.1; 242/335; 242/338.4; 242/588; 242/588.6; 242/597.2; 242/597.6; 242/598.2; 242/598.3; 242/598.4; 242/599

(58) Field of Classification Search .................. 156/384, 156/494, 502, 504, 505, 538, 541, 577, 584; 242/129.6, 324.2, 326, 326.1, 335, 338.4, 242/588, 588.6, 597.2, 597.6, 598.2, 598.3, 242/598.4, 599
See application file for complete search history.

(56) References Cited

U.S. PATENT DOCUMENTS

| | | | | | |
|---|---|---|---|---|---|
| 2,693,382 | A | * | 11/1954 | Teetor | 292/251.5 |
| 3,403,869 | A | * | 10/1968 | Marchisen et al. | 242/597.8 |
| 4,290,840 | A | * | 9/1981 | Pabodie et al. | 156/384 |
| 5,676,298 | A | | 10/1997 | Lam | |
| 5,725,721 | A | | 3/1998 | Yeh | |

* cited by examiner

*Primary Examiner* — Katarzyna Wyrozebski Lee
*Assistant Examiner* — Joshel Rivera
(74) *Attorney, Agent, or Firm* — C. A. Rowley

(57) ABSTRACT

This invention relates to a tape applicator or tape head formed from a combination of two separated apparatuses namely a detachable unit containing a front portion of the tape applicator and a stationary unit containing a rear portion of the applicator with snap-on engagement there between to obtain the interactive motion of a conventional tape applicator i.e. the present invention separates a conventional tape applicator into two separate portions which results in the ability to quickly change tapes and reduces safety hazards.

10 Claims, 5 Drawing Sheets

CASE SEALER TAPE APPLICATOR

FIELD OF INVENTION

The present invention relates to an improve tape applicator for case sealing equipment, more particularly to a tape applicator that facilitates changing of the tape roll to improve the efficiency of the equipment.

BACKGROUND OF THE PRESENT INVENTION

Conventional tape applicators or tape heads used for applying adhesive tapes to a box or carton or the like to seal the box flaps in closed position generally include a front link, having a wiper roll to apply the leading end of the tape to the leading face a carton moved relatively past the tape head, a trailing arm with a wiper roll for wiping the tape on the adjacent surface of the box and along the trailing end of the box and a cut off knife between the two arms and actuated to cut the tape to the proper length and with a free end adjacent to the wiper roll on the front link in a position to be applied to the next box. These applicators are common in the industry and have been found to operate very well. See for example U.S. Pat. No. 5,676,298 issued Oct. 14, 1997 to Lam or U.S. Pat. No. 5,725,721 issued Mar. 10, 1998 to Yeh.

As indicated in case sealing, a roll of tape having a finite length is installed onto each applicator, namely the top tape head and the bottom tape head, as well as side mounting tape head (if needed) for different configurations of box sealing. The tape head is secured in position in the machine accordingly. When it is necessary to replace the depleting tape roll with new roll of tape it is a common practice for the operator to stop the machine, reach in the machine and remove the entire tape head from the machine and then to replace the tape roll on the removed tape head, or replace the tape head with a different tape head having a fresh tape roll already installed to save time. Alternatively, the operator may reach in to the machine, remove the depleted tape roll and install a new roll of tape without taking the tape head away from the machine. When access to the tape head is limited, it is also a common practice to mount the tape roll away from the tape head and provide guide rollers appropriately positioned to guide the tape to the applicator and to splice the new roll of tape onto the depleting tape. Obviously replacing the depleted roll with a new roll is a time consuming operation as it involves threading the lead end of the tape from the new roll through the tape applicator.

Other methods are also being used to make replenishing or changing tape roll easier. For example a tape head mounted onto a pivoted bracket with lever to swing the tape head up, making the tape head more accessible for the operator to replace the tape roll. Automatic tape changing and splicing designs (see U.S. Pat. No. 5,676,792 issued Oct. 14, 1997 and U.S. Pat. No. 6,189,587 issued Feb. 20, 2001 both to Cairns) are other known systems to facilitate tape roll changing and reduce down time.

BRIEF DESCRIPTION OF THE PRESENT INVENTION

The invention provides a simple and effective approach to replenishing the tape in case sealing applications and reducing down time and safety hazards.

This invention is related to a tape applicator or tape head which is a combination of two separate apparatuses with snap-on engagement to obtain the interactive motion of a conventional tape applicator i.e. the present invention separates a conventional tape applicator into two separate portions with specific functionality to serve the purpose of quick tape change and reduce safety hazards.

The tape applicator of the present invention is composed of two separable portions namely a detachable unit and a stationary or fixed unit mounted to the machine. The detachable unit, includes a first portion of the tape applicator mechanism, and is formed by an auxiliary frame that mounts a tape roll holder, tape guiding rollers, a contact roller, a coupler and a connecter while a stationary unit, includes a second portion of the tape applicator mechanism, and is formed by a main frame that mounts a tape cutting mechanism; a connecting link with a cooperating coupler; wipe down roller mechanism and a cooperating connector The connector and cooperating connector cooperate to connect the detachable unit to the stationary unit and the coupler and cooperating coupler connect the first and second portions of the tape applicator to function interactively when the detachable unit is mounted to the stationary unit.

As indicated the detachable unit that may be coupled to or removed from the main frame of the stationery unit includes a coupler that cooperates with the cooperating coupler on the connecting link of the stationary unit to couple the wipe down roller on the stationary unit with the contact roller on the detachable unit so that these elements combine for performing the taping function.

One or more detachable units each with a fresh tape roll installed may be available for a single stationary unit and each detachable unit used as required to replace a detachable unit with depleted tape. The detachable units facilitate quick tape roll replenishing and minimize machine down time.

The operator has only to remove and replace the detachable unit from the machine as opposed to the entire tape head as in the prior art, thereby making tape replacement easier and quicker. Since the stationary unit contains the cutting mechanism; and remains with the machine, a significant safety advantage is provided as when the operator installs the new tape on the detachable unit he cannot be injured by the cutting blade, since there is no cutting blade on the detachable unit.

Broadly the present invention relates to a tape applicator comprising a detachable unit and a stationary unit, said detachable unit mounting a front portion of a taping mechanism and said stationary unit a rear portion of said taping mechanism, a connector on said detachable unit and a cooperating connector on said stationary unit which combine to releasably mount said detachable unit on said stationary unit and connect said stationary unit with said detachable unit, a coupler on said detachable unit and a cooperating coupler on said stationary unit, said coupler and said cooperating coupler combining to form a releasable coupling releasably, operatively interconnecting said front and said rear portions of said taping mechanism when said detachable unit is mounted on said stationary unit.

Preferably, said front portion includes a front link mounting said coupler on its side adjacent to said rear portion.

Preferably, said coupler comprises a cam track.

Preferably, said rear portion includes a connecting link and said cooperating coupler comprises an engagement roller at an end of said connecting link adjacent to said front portion.

Preferably said front portion includes a front link and wherein a latch releasably fixes said front link relative to a frame of said front portion.

Preferably, said latch comprises a magnetic connecting said front link to said frame.

BRIEF DESCRIPTION OF THE SEVERAL VIEWS OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
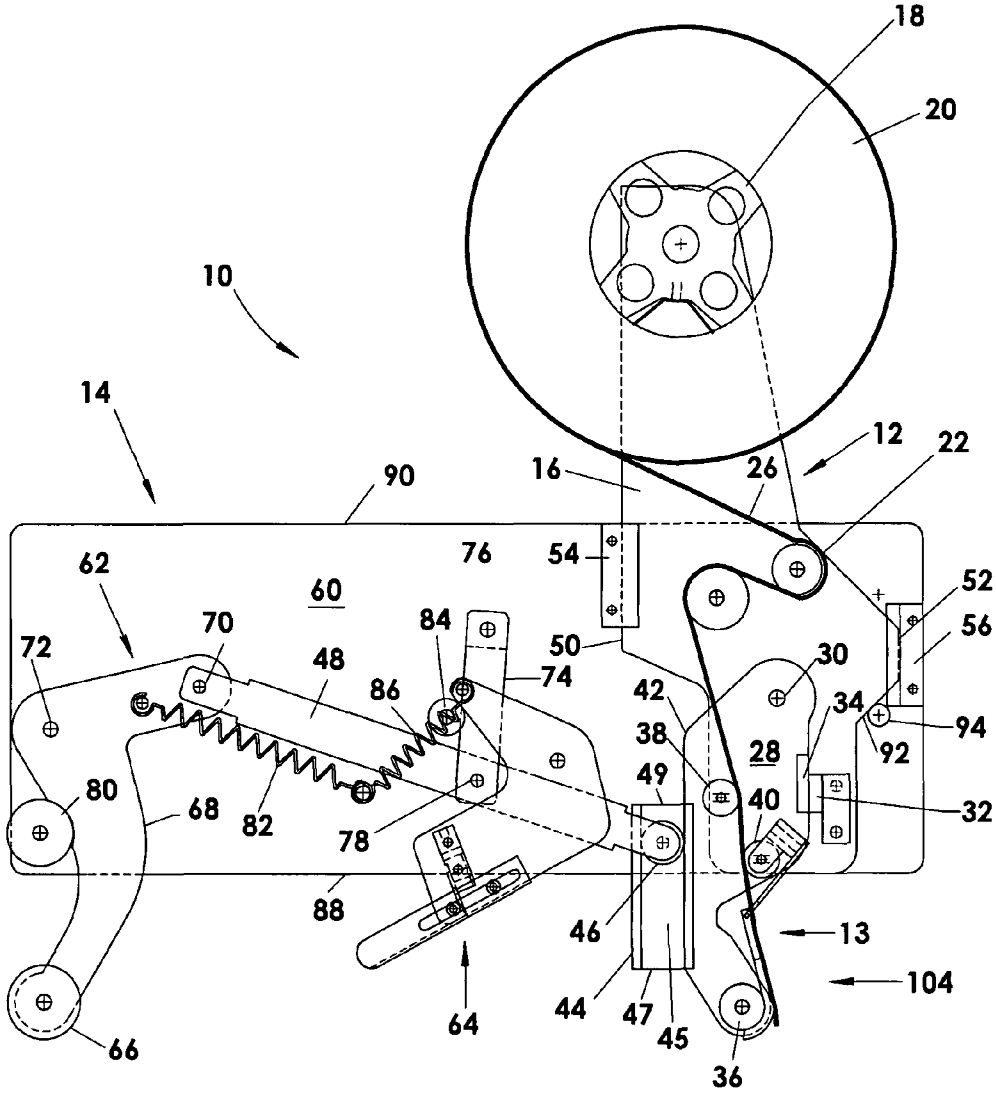
FIG. 1 is a schematic side elevation illustration showing the present invention with the detachable unit engaged onto the stationary unit for a top taping application.

As shown in the drawings the tape applicator 10 of the present invention is composed of two units a detachable unit 12 that is removeably mounted in a stationary unit 14 that is fixed to the machine (not shown) in which the tape applicator is to be used. (See FIGS. 1 to 5, FIGS. 1 to 3 showing a top tape applicator and FIGS. 4 and 5 a bottom tape applicator).

The detachable unit 12 is formed by an auxiliary frame 16 on which is mounted a front portion 13 of the tape applicator mechanism. This front portion 13 (front in that it is used to apply tape to the front end 102 of the box 100 as it moves through the tape applicator 10) includes. a tape roll holder 18 for mounting a roll of tape 20 and tape guiding rollers 22 and 24 if required around which the tape 26 is passed. A front link 28 is pivotably mounted to the auxiliary frame 16 on axel 30 and forms part of the front portion 13. This front link 28 is releasably held in place for insertion and removal from the stationary unit 14 by a magnet 32 fixed to the frame 16 and cooperating metal (iron) plate 34 fixed to the front link 28. The magnet 32 and plate 34 form a releasable latch limiting movement of the link 28 relative to the frame 16 and cooperate to hold the front link 28 in proper alignment for insertion into the stationary unit 14 while permitting the front link 28 to pivot freely on axel 30 when the latch is released i.e. the magnetic connection is broken as a box is moved through the tape applicator 10 (as will be described below).

Figure 6:
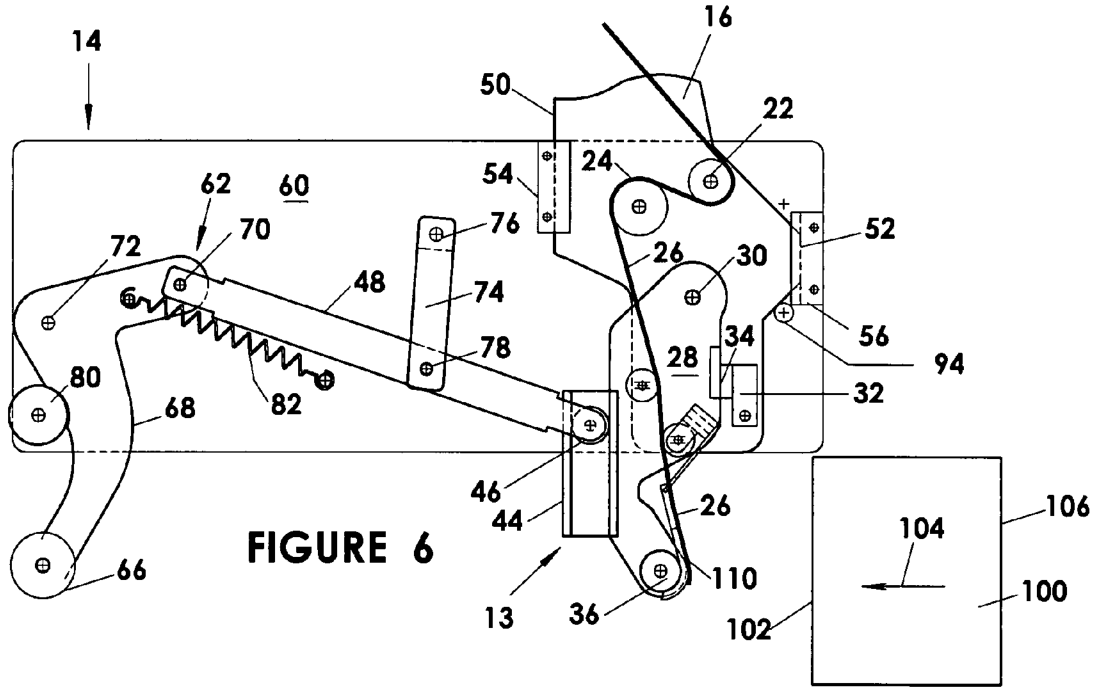
FIG. 6 is a side elevation schematic illustration with the cutting mechanism omitted showing stationary and detachable units engaged and in normal position for tape application.
Figure 7:
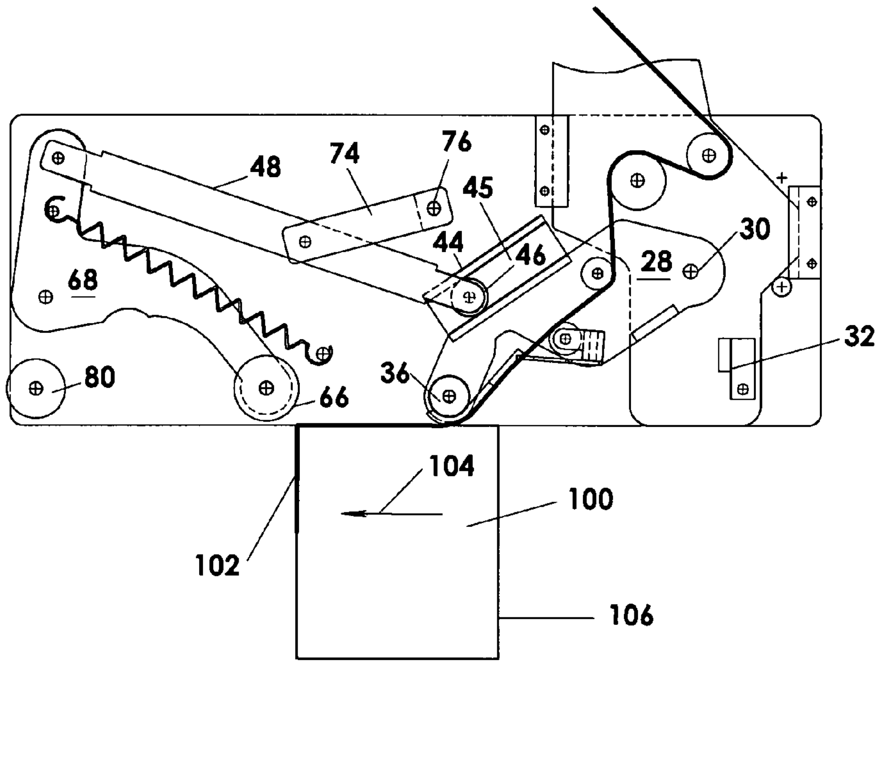
FIG. 7 is a schematic illustration similar to FIG. 6 showing the interaction between the detachable unit and the stationery unit during the tape application.

Mounted on front link 28 (front in that it is used to apply tape to the front end 102 of the box 100 as it moves through the tape applicator 10 but trailing in the direction of movement of a box through the tape applicator 10 as indicated by the arrow 104 (see FIGS. 6 and 7)) is a front contact pad or roller 36 which applies the leading end of the tape 26 to the front end 102 (leading end in the direction of travel of the box 100 as indicated by the arrow 104, see FIGS. 6 and 7) and functions in the same manner conventional similar front contact rollers on known machines. Also mounted on the link 28 is a second pair of guide rolls 38 and 40, if required, which direct the tape 26 to the contact pad or roller 36.

Positioned along the leading edge 42 (edge adjacent to the rear portion 62 and leading in the direction of relative movement 104 of the box 100 through the tape applicator 10) of the link 28 is a coupler 44 in the form of a cam track 45 having its opposite ends open as indicated at 47 and 49 that receives an engagement roller 46 that provides a cooperating coupler mounted on the trailing end (end adjacent to the front portion 13 and trailing in the direction 104 of movement of the box 100) of a connecting link 48 mounted on the stationary unit 14 as will be described below. The coupler 44 and cooperating coupler 46 combine to form a releasable coupling releasably coupling the front 13 and rear (described below) 62 portions of tape applicator mechanism together in operative relationship.

The opposite ends 47 and 49 of the track 45 are preferably both open so that the detachable unit may be used for either a top taping applicator or a bottom taping applicator as will be described below with reference to FIGS. 2 and 3 and 4 and 5 respectively.

Leading and trailing edges 50 and 52 (relative to the direction of box movement 104) of the frame 16 form connectors and/or guides which cooperate with cooperating connectors 54 and 56 and/or guides on the stationary unit 14 to define releasable connectors to hold and guide the detachable unit 12 onto the stationary unit 14.

The stationary unit 14 is formed by a main frame 60 that will be fixed to the sealing machine (not shown) in any suitable manner and mounts the cooperating connectors and/or guides 54 and 56 and a rear portion 62 of the tape applicator mechanism which combine with the front portion 13 to provide the tape applicator 10. A tape cutting mechanism 64 which normally would be considered part of the rear portion 62 is mounted on the frame 60 as is the connecting link 48 with coupling roller 46 referred to above; and a wipe down roller 66 which is mounted on an L shaped arm 68 connected to the link 48. The L shaped arm 68 is pivotably mounted to the main frame 60 on an axel 72 and is connected to the end of link 48 remote from roller 46 via pivot pin 70. The pin 70 is positioned on the side of the arm 68 remote from the roller 66.

A control link 74 is pivotably connected adjacent to one of its ends to the frame 60 on pin 76 and adjacent to its opposite end to the connecting link 48 via a pin 78 so that the pin 78 and thus the link 48 swings on an arc around the pin 76 when the second portion 62 of the tape applicator is active The axes of rotation of all of all axels, pivot pins, engagement roller 46 and wipe down roller 66 and guide rollers are all substantially parallel and perpendicular to the direction of movement 104 of the box 100

The arm 68 is held against the stop 80 via spring 82 while the cutting mechanism 64 is pivoted to its engaging position against the stop 84 via the spring 86.

Figure 2:
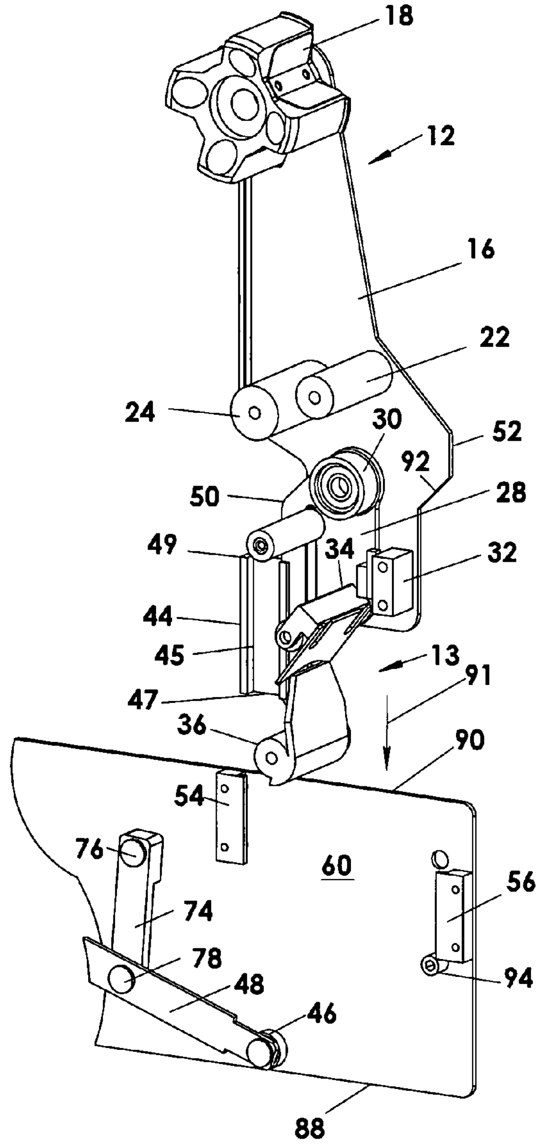
FIG. 2 is a schematic isometric illustration with parts omitted showing the stationary and detachable units separated and positioned to be connected together for a top taping application.
Figure 3:
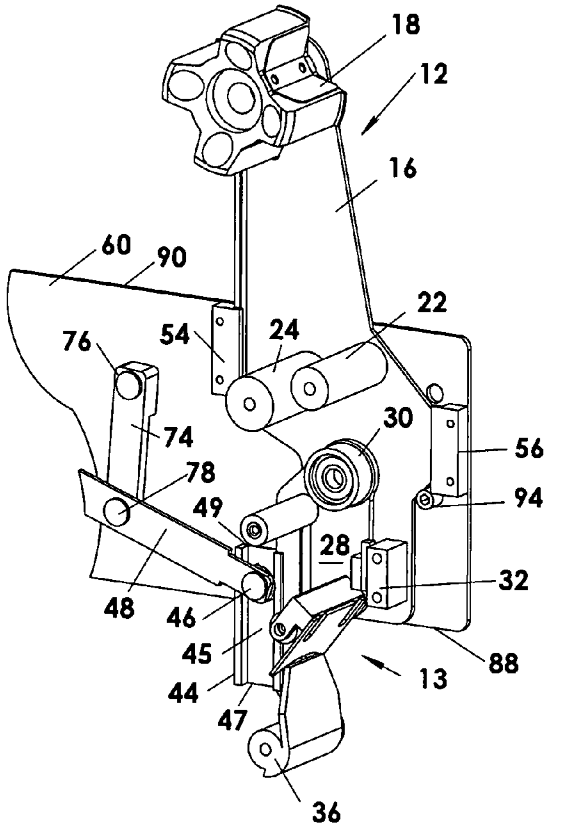
FIG. 3 is an isometric schematic illustration with parts omitted similar to FIG. 2 but showing the detachable unit and the stationary unit connected as in FIG. 1.
Figure 4:
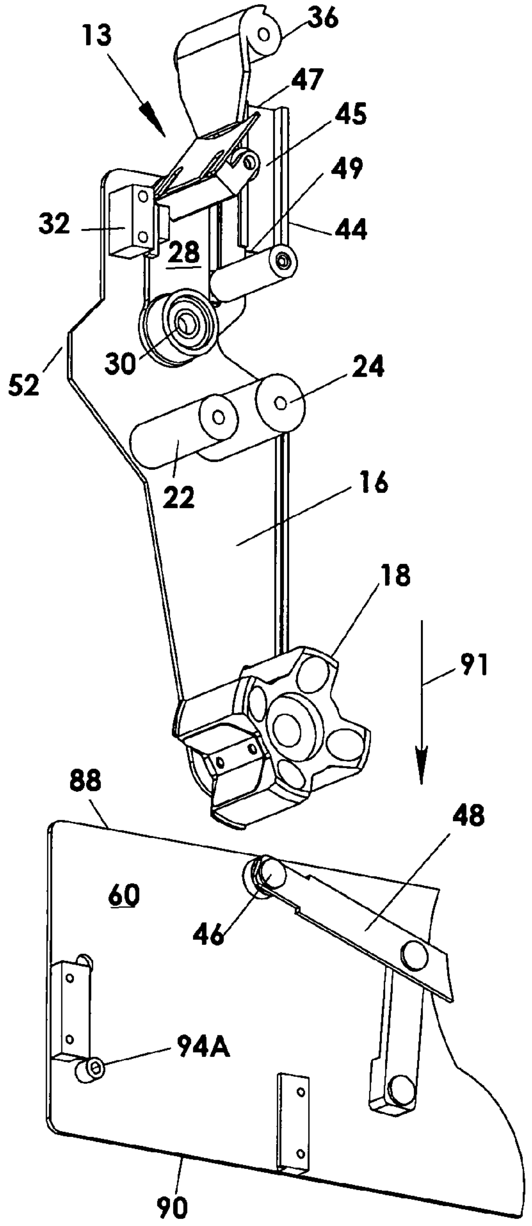
FIG. 4 and FIG. 5 respectively is a schematic illustration similar to FIG. 2 and FIG. 3 but showing the stationery unit in up-side down position and the detachable unit being inserted and engaged in up-side down position, for a bottom taping application.
Figure 5:
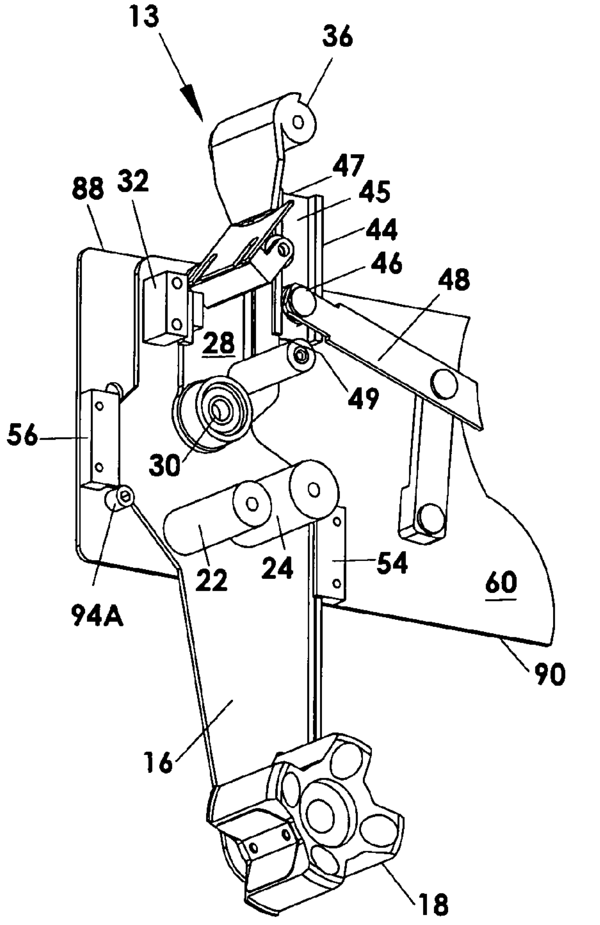

When the tape applicator 10 is being used as a top tape applicator the frame 60 is mounted in the machine with the roll 46 adjacent the bottom edge 88 of the of the frame 60 and the connector and or guide 54 adjacent to the top edge 90 of the frame 60 as shown in FIGS. 1, 2 and 3. The detachable unit 12 is move down as indicated by the arrow 91 to slide the edges 50 and 52 into their respective connectors or guides 54 and 56 and the abutment edge 92 on the frame 16 is moved into resting position against the stop 94 on the frame 60 positioned below the connecter and/or guide 56. As the unit 12 is slid into position as above described the roll 46 is moved into the cam 45 of the coupler 44 through open end 47 to couple the operating mechanisms 62 and 13 of the stationary and detachable units 12 and 14 respectively together. The releasable latch 32, 34 holds the arm 28 in position to facilitate alignment of the roll 46 with the cam 45. This positioning and coupling of the detachable unit 12 with the stationary unit 14 ensures that the two units 12 and 14 are in their cooperative operative positions.

On the other hand if the device 10 is to be used as a bottom taper for taping the bottom of a box 100 the frame 60 is inverted so the edge 90 becomes the bottom edge and the edge 88 the top edge (see FIGS. 4 and 5) and the stop 94 is moved to the opposite side of the connector/guide 56 i.e. adjacent to the edge 90. The unit 12 is also inverted and slid into position as above described, with respect to FIGS. 2 and 3 however the roll 46 in this arrangement enters the cam 45 via the open end 49 not 47 as in the FIGS. 2 and 3 arrangement.

The operation of the device is illustrated in FIGS. 6 and 7 and as is apparent the operation is essentially the same as the conventional tape applicators in widespread use in the industry. The box or carton 100 is moved as indicated by the arrow 104 to force the leading wall 102 of box 100 against the leading end 110 of the tape 26 which has its adhesive side facing the wall 102 to apply the tape 26 to the leading wall 102 and the pad or roller 36 operates in the conventional manner to wipe the tape 26 against 10 and up the wall 102 and to move via the coupling formed by the cam 45 and roller 46 and connecting link 48 the arm 68 from the stop 80 and position the rear applicator roll 66 above the top of the box as required. The roll 66 is held against the top of the box in the known manner until the clears the rear end of the top of the box and can follow down the rear wall 106 of the box in known manner. The taping operation is completed in the conventional manner by the cutter 64 severing the tape 26 and leaving a free end 110 in position to be engaged by the arm 28 and roller 36 and moved to the position shown in FIG. 6.

Figure 8:
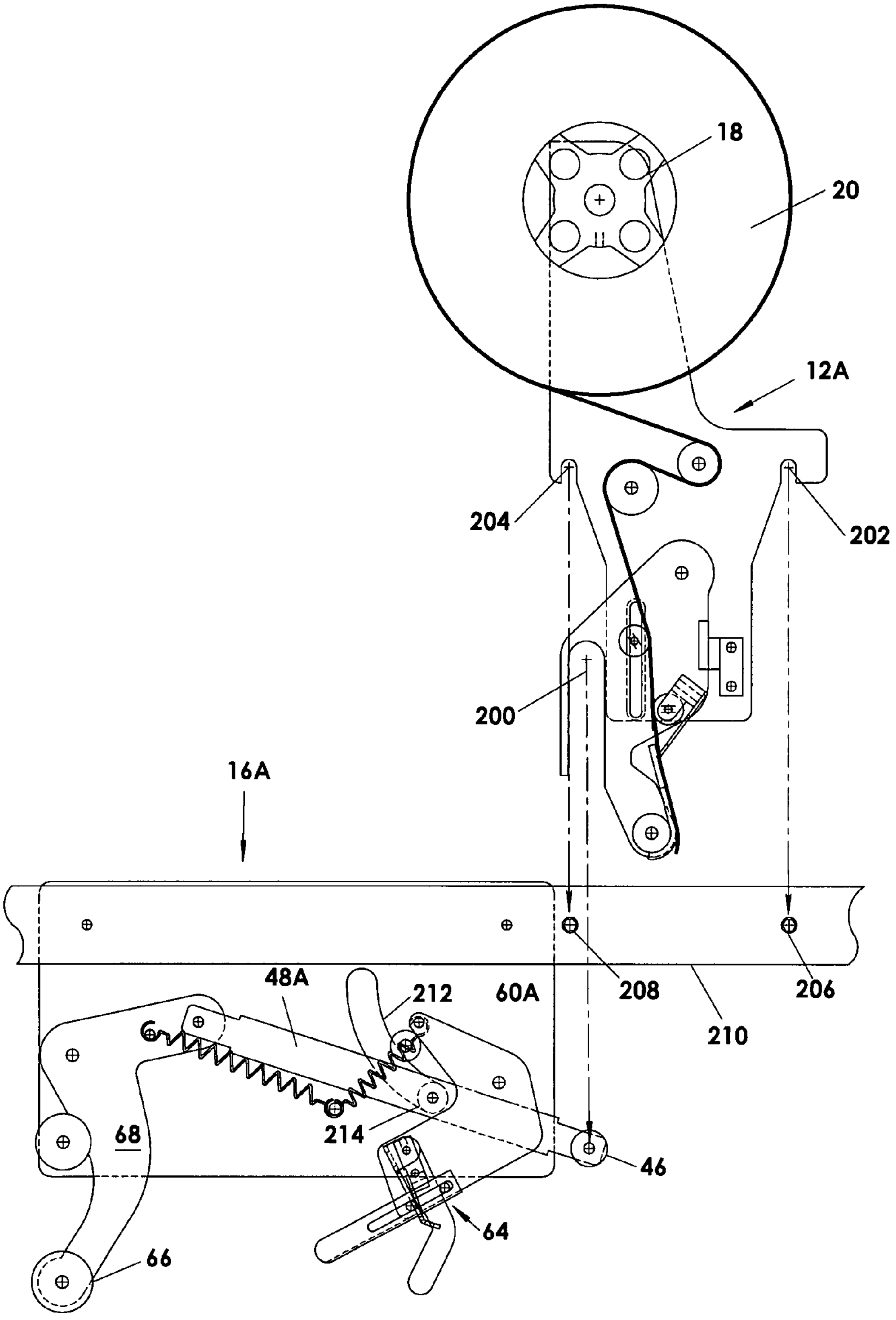
FIG. 8 is a schematic illustration showing examples of variations of the present invention.

FIG. 8 shows some variations to the invention namely (a) The use of open ended engagement slot 200 on the front detachable unit 12A which replaces the cam 45 and cooperates with the roller 46. Obviously this arrangement is only applicable to a tape applicator for apply tape to the top of a box.

(b) A slot or track 212 in the frame 60A of the stationery unit 14A cooperating with a retaining roller 214 on the connecting link 48A (equivalent to link 48) to control and position the cooperating coupler roll 46 and the mechanisms on the stationary unit 16A in place of the link 74 of the FIG. 1 embodiment, and.

(c) the use of open ended slots 202 and 204 which engage with cooperating connecters pins 206 and 208 respectively on an extension bracket or arm 210 extending from the main frame 60A of the stationary unit 16A;

It is evident that this invention may be applied to case sealers with the applicator mounted in different position, such as top and or bottom sealing with the applicators mounted on top and the bottom of the machine opposite to each other according to the travel pave of the box. Side sealing with applicator mounted accordingly on the side is also achievable. Appropriate external mounting bracket can be applied to ensure proper and easy insertion and engagement of the two units.

Having described the invention, modifications will be evident to those skilled in the art without departing from the scope of the invention as defined in the appended claims.

The invention claimed is:

1. A tape applicator comprising a detachable unit and a stationary unit, said detachable unit providing a front portion of said taping mechanism, said stationary unit a rear portion of said taping mechanism, a connector on said detachable unit and a cooperating connector on said stationary unit which combine to releasably mount said detachable unit on said stationary unit and connect said stationary unit with said detachable unit, a coupler on said front portion of said taping mechanism and a cooperating coupler on said rear portion of said taping mechanism, said coupler and said cooperating coupler combining to form a releasable coupling releasably, operatively interconnecting said front and said rear portions of said taping mechanism when said detachable unit is mounted on said stationary unit.

2. A tape applicator as defined in claim 1 wherein said rear portion includes a connecting link and said cooperating coupler comprises an engagement roller at an end of said connecting link adjacent to said front portion.

3. A tape applicator as defined in claim 1 wherein said rear portion includes a connecting link and said cooperating coupler comprises an engagement roller at an end of said connecting link adjacent to said front portion and wherein said engagement roller is received within said cam track when said detachable unit is mounted to said stationary unit.

4. A tape applicator as defined in claim 1 wherein said front portion includes a front link and wherein a latch releasably fixes said front link relative to a frame of said front portion.

5. A tape applicator as defined in claim 1 wherein said front portion includes a front link mounting said coupler on its side adjacent to said rear portion.

6. A tape applicator as defined in claim 2 wherein said front portion includes a front link and wherein a latch releasably fixes said front link relative to a frame of said front portion.

7. A tape applicator as defined in claim 3 wherein said front portion includes a front link and wherein a latch releasably fixes said front link relative to a frame of said front portion.

8. A tape applicator as defined in claim 5 wherein said front portion includes a front link and wherein a latch releasably fixes said front link relative to a frame of said front portion.

9. A tape applicator as defined in claim 5 wherein said coupler comprises a cam track.

10. A tape applicator as defined in claim 5 wherein said rear portion includes a connecting link and said cooperating coupler comprises an engagement roller at an end of said connecting link adjacent to said front portion.

* * * * *